(12) United States Patent
Bjarnestam et al.

(10) Patent No.: US 10,445,359 B2
(45) Date of Patent: Oct. 15, 2019

(54) METHOD AND SYSTEM FOR CLASSIFYING MEDIA CONTENT

(75) Inventors: Anna Bjarnestam, Norberg (SE); Mary Forster, Seattle, WA (US); Nate Gandert, Seattle, WA (US); Steven F. Heck, Seattle, WA (US); Ziji Huang, Seattle, WA (US); Monika MacGuffie, Seattle, WA (US); Alvin Nance, Seattle, WA (US); Thomas M. O'Leary, Seattle, WA (US)

(73) Assignee: Getty Images, Inc., Seattle, WA (US)

( * ) Notice: Subject to any disclaimer, the term of this patent is extended or adjusted under 35 U.S.C. 154(b) by 77 days.

(21) Appl. No.: 11/449,380

(22) Filed: Jun. 7, 2006

(65) Prior Publication Data

US 2007/0112838 A1 May 17, 2007

Related U.S. Application Data

(60) Provisional application No. 60/688,055, filed on Jun. 7, 2005.

(51) Int. Cl.
  *G06F 16/48* (2019.01)
(52) U.S. Cl.
  CPC .................................. *G06F 16/48* (2019.01)
(58) Field of Classification Search
  CPC ...... G06F 3/0481; G06F 16/00; G06F 16/583; G06F 16/48; G06F 16/907; G06F 16/58; G06F 16/78
  USPC ................. 707/2, 3, 4, 104.1, 101, 999.003, 707/999.005, 999.007, 778, 791; 704/1, 704/4; 709/203, 219, 231; 715/229, 256
  See application file for complete search history.

(56) References Cited

U.S. PATENT DOCUMENTS

| | | | |
|---|---|---|---|
| 5,745,602 A * | 4/1998 | Chen et al. | 382/229 |
| 5,893,101 A | 4/1999 | Balogh et al. | |
| 5,963,205 A | 10/1999 | Sotomayor | |
| 6,192,360 B1 * | 2/2001 | Dumais et al. | 707/6 |
| 6,405,162 B1 | 6/2002 | Segond et al. | |
| 6,735,583 B1 * | 5/2004 | Bjarnestam et al. | 707/2 |
| 6,941,294 B2 | 9/2005 | Flank | |
| 6,944,611 B2 | 9/2005 | Flank et al. | |
| 7,320,000 B2 * | 1/2008 | Chitrapura et al. | |

(Continued)

OTHER PUBLICATIONS

Fragos K et al. "Word Sense Disambiguation using WORDNET relations," Proceedings of Balkan Conference in Informatics, Oct. 2003.

(Continued)

*Primary Examiner* — Arpan P. Savla
*Assistant Examiner* — Bao G Tran
(74) *Attorney, Agent, or Firm* — Perkins Coie LLP (57) ABSTRACT

A hardware and software facility for classifying media content units using keywords from a structured vocabulary. Metadata associated with each media content unit is segmented into a series of descriptive phrases. The descriptive phrases are mapped to keywords in a structured vocabulary, and the identified keywords associated with the media content units. Descriptive phrases that are not found in the structured vocabulary are tracked as candidate phrases for later addition to the structured vocabulary. A keyword index to the media content units may be constructed. The index is used to identify specific media content units that are responsive to search queries in a reliable and accurate fashion.

47 Claims, 7 Drawing Sheets

(56) References Cited

U.S. PATENT DOCUMENTS

| | | | |
|---|---|---|---|
| 7,546,288 B2* | 6/2009 | Springer et al. | |
| 7,603,349 B1* | 10/2009 | Kraft et al. | |
| 2002/0042923 A1 | 4/2002 | Asmussen | |
| 2004/0249859 A1* | 12/2004 | Ward et al. | 707/104.1 |
| 2005/0097628 A1 | 5/2005 | Lussier et al. | |
| 2005/0114141 A1* | 5/2005 | Grody | 704/270 |
| 2005/0283357 A1 | 12/2005 | MacLennan et al. | |
| 2006/0069733 A1* | 3/2006 | Antonoff et al. | 709/206 |
| 2006/0112067 A1* | 5/2006 | Morris | 707/1 |
| 2006/0117040 A1* | 6/2006 | Begeja et al. | 707/100 |
| 2006/0149781 A1* | 7/2006 | Blankinship | 707/103 R |
| 2006/0265503 A1* | 11/2006 | Jones et al. | 709/227 |
| 2007/0005581 A1* | 1/2007 | Arrouye et al. | 707/4 |

OTHER PUBLICATIONS

Nstein Technologies, Inc., "Npower your knowledge," Technology White Paper, 2001, 21 pages.

Google Advanced Image Search, http://images.google.com/advanced_image_search?hl=en, 1 page [internet accessed on Apr. 28, 2006].

Tasi, "A Review of Image Search Engines," http://www.tasi.ac.uk/resources/searchengines.html, 17 pages [internet accessed on Apr. 28, 2006].

U.S. Final Office Action dated Dec. 8, 2008 under U.S. Appl. No. 11/449,566, filed Jun. 7, 2006, 19 pages.

U.S. Non-Final Office Action dated May 29, 2008 under U.S. Appl. No. 11/449,566, 29 pages.

Amendment in Response to Non-Final Office Action; U.S. Appl. No. 11/449,566, filed Jun. 7, 2006; Applicants: Bjarnestam et al.; Amendment filed Sep. 30, 2008; 17 pages.

European Office Action; European Patent Application 06013941.7; Filed Jul. 5, 2006; Applicant: Getty Images, Inc.; dated Aug. 21, 2008; 6 pages.

Office Action received for counterpart European Patent Application No. 06013941.7, dated Jun. 13, 2018 (8 pages).

Fragos, K. et al., "Word Sense Disambiguation Using WORDNET Relations." Proceedings of Balkan Conference in Informatics, XX, XX, Oct. 2003 (Oct. 2003), XP002383979.

* cited by examiner

| MCU ID | 0167298 | 6972869 | 7295863 | 8006215 |
|---|---|---|---|---|
| Keyword 1 | Lance Armstrong | sailboat | mountain | pele |
| Keyword 2 | finish line | sails | K2 | soccer |
| Keyword 3 | win | wind | climbing | |
| Keyword 4 | Tour de France | | summit | |
| Keyword 5 | | | | |
| Candidate 1 | | | Ed Viesturs | |
| Candidate 2 | | | | |

METHOD AND SYSTEM FOR CLASSIFYING MEDIA CONTENT

CROSS-REFERENCE TO RELATED APPLICATIONS

This application claims priority to, and incorporates by reference in its entirety, U.S. Provisional Application No. 60/688,055 filed on Jun. 7, 2005.

TECHNICAL FIELD

The present invention relates to classifying media content using a structured vocabulary.

BACKGROUND

The amount of information available in the World Wide Web and other document corpora continues to expand at a significant pace. Users with a connection to the Internet or other networks are able to search for and identify a large volume of content that would previously have very been difficult or even impossible to find. Unfortunately, the ease of locating certain content varies significantly by the format of the content that is sought. While users seeking textual content on the World Wide Web have a number of good search services such as google.com to identify results responsive to a search query, the performance of tools to search for other types of content have lagged far behind. In particular, many types of media, including but not limited to, audio, video and images, are difficult to classify and locate for retrieval in an automated fashion (an instance of any type of media will hereinafter be referred to as a media content unit).

Media content units are particularly challenging to accurately search because there are few reliable algorithms that can programmatically analyze the content in a media content unit and store the media content unit in a manner that allows it to be efficiently located. For example, a human user looking at a picture of a sailboat will very quickly be able to determine not only that the image is a sailboat, but also extract other pieces of information about the image such as the number of people on the sailboat, the color of the sailboat sails, and the condition of the surrounding seas. While image evaluation systems have been developed that use various techniques to describe and classify images, detecting the colors, shapes, and textures of an image to derive the subject matter of the image is an incredibly challenging and complex problem. As a result, automated image evaluation systems have fallen short of the performance necessary to become commercially successful. The same limitations and problems extend to other media content, such as audio or video, as well.

Because of the performance limitations of automated media content recognition systems, some systems have relied upon a file name or on metadata associated with a media content unit to predict the contents of the media content unit. Unfortunately, however, using the file name or metadata provided by a large body of users may not provide optimum results since different users often use vastly different naming conventions to describe the same content. For example, an image of a sailboat under sail may be characterized by one user as "hard tack to port" whereas another user may characterize it as "enjoying a gusty day on the seas." Search engines that rely upon vocabulary selected by a large body of users to characterize media may therefore return inherently unreliable results.

A different approach is taken by U.S. Pat. No. 6,735,583 to Bjarnestam et al. entitled "Method and System for Classifying and Locating Media Content," and assigned to the applicants of the present case. Bjarnestam et al. disclose a structured vocabulary system that may be used in a media classification and search system to provide a better index to media content. Such a system solves many of the problems identified above, but does so with a manually intensive process. While the system disclosed in Bjarnestam et al. provides superior performance to other existing technologies, it would be beneficial to further automate the classification of media content units in order to make available for searching a greater number of media content units.

DETAILED DESCRIPTION

A hardware and software facility is disclosed for analyzing metadata associated with media content units and classifying the media content units using keywords in a structured vocabulary. A media content unit is a media resource that can be electronically stored and that contains images or sound, either separately (e.g. photos, slideshows, silent films or audio recordings), combined (e.g., videos or animation), or in conjunction with other content (e.g., presentations with text, multimedia presentations). The analysis of the metadata and the classification of the associated media content units using the structured vocabulary is preferably done in an automated fashion. The metadata associated with each media content unit is segmented into a series of descriptive phrases, where a descriptive phrase is one or more words, numbers, characters, or other symbols. The facility matches the descriptive phrases to keywords in a structured vocabulary, and associates the identified keywords with the media content units. Descriptive phrases that were not found in the structured vocabulary are tracked as candidate phrases for later addition to the structured vocabulary. A keyword index to the media content units may be constructed. The index is used to identify specific media content units that are responsive to search queries in a reliable and accurate fashion. Alternatively, the keywords may be used in a browse hierarchy to allow users to navigate to desired media content units. The keywords may also be displayed in conjunction with media content units to further characterize the media content units.

The facility includes a segmentation tool that applies a rule set to extract certain descriptive phrases from the metadata. Pre-processing may be performed on the metadata to remove words, numbers, characters, and other symbols that are not useful in the classification process. Segmentation of the remaining metadata into descriptive phrases is performed in an automated fashion without human intervention, thereby enabling the efficient classification of a significant number of media content units. In an embodiment of the facility, the segmentation tool relies on an application-specific dictionary to aid in the segmentation process. To improve segmentation efficiency, the application-specific dictionary is a subset of all of the keywords contained in the structured vocabulary. Accurate segmentation significantly increases the number of media content units classified by the facility, and ultimately results in a more accurate matching of media content units to associated keywords. Post-processing of the descriptive phrases may be performed to weight the descriptive phrases according to the relative importance of the descriptive phrase to the media content unit.

The facility enables descriptive phrases that are tracked as candidate phrases to be added as keywords to the structured vocabulary. The determination of whether to add a descriptive phrase to the structured vocabulary may be based in part on the type of descriptive phrase. The determination of whether to add a descriptive phrase to the structured vocabulary may also be based in part on the frequency with which the descriptive phrase occurs in the metadata. The descriptive phrase may be automatically added as a keyword to the structured vocabulary, or may be added by an operator.

Various embodiments of the invention will now be described. The following description provides specific details for a thorough understanding and enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
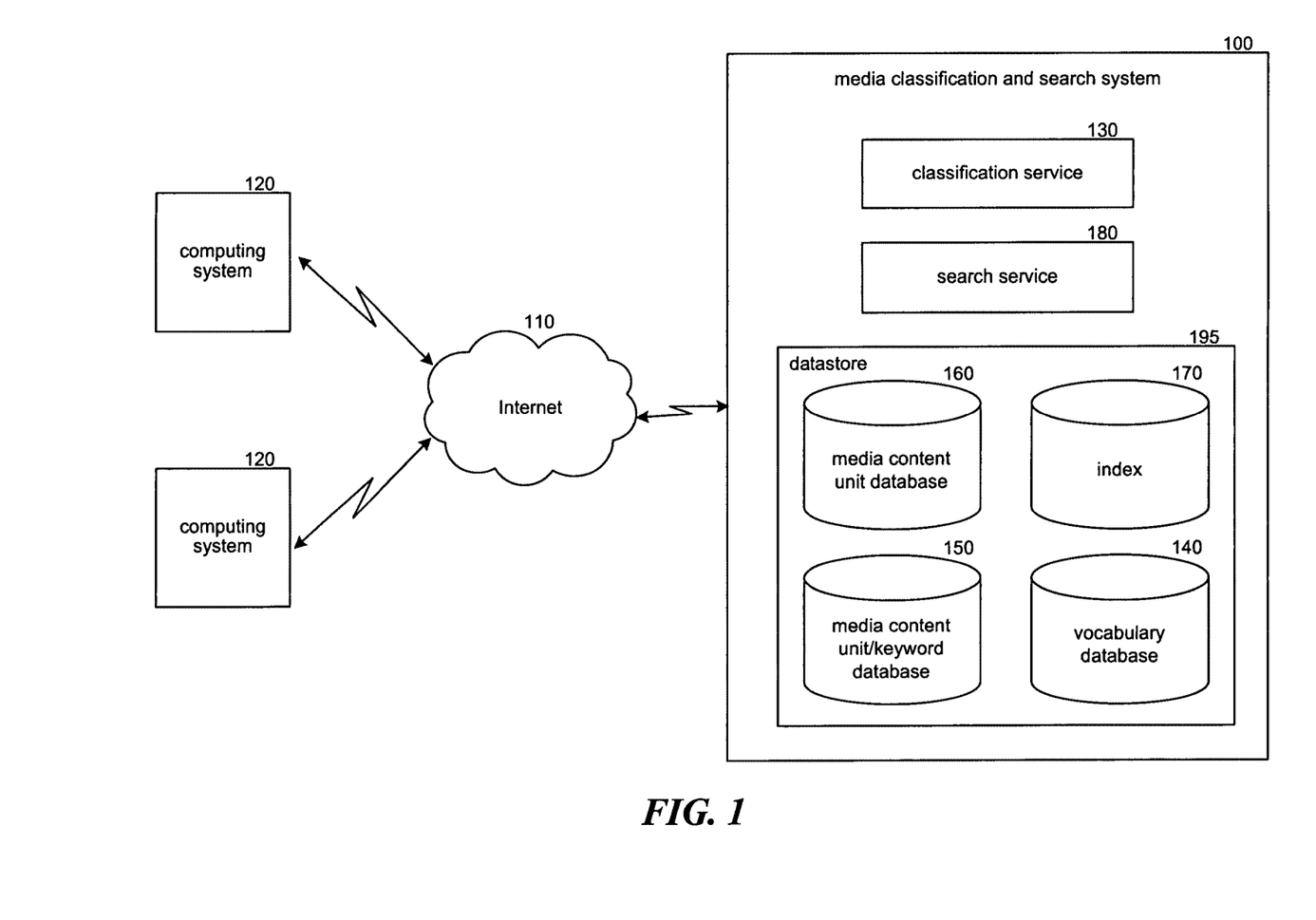
FIG. 1 is a block diagram illustrating components of a facility for classifying and searching for media content.

FIG. 1 is a block diagram illustrating the components of a media classification and search system 100. The classification and search system 100 is capable of automatically classifying media content units using keywords from a structured vocabulary and enabling access to the media content units via keyword search or keyword navigation. The media classification and search system 100 is connected via a communication medium, for example the Internet 110, a proprietary network, or other communication connection, to a number of remote computing systems 120. Metadata associated with media content units is received by the facility via the communication medium and is processed by a classification service 130. The received metadata may be structured, unstructured, or a combination of the two. Structured metadata is metadata that has a known identity or format, for example, a portion of the metadata that describes the author of the media content unit. Unstructured metadata is metadata that contains information of an unknown identity or unknown format. Classification service 130 associates one or more keywords contained in a structured vocabulary with each media content unit based on some or all of the metadata. The structured vocabulary may be hierarchical or non-hierarchical. The structured keyword vocabulary is stored in a database 140, and the mapping of media content units to the keywords in the vocabulary database is stored in a database 150. The underlying media content unit or a pointer to the location where the media content unit is stored (such as a network path) may be stored in a media content unit database 160. Once media content units are associated with keywords in the structured vocabulary, the facility may generate a reverse index 170. The index 170 allows media content units to be identified that are responsive to search terms contained in search queries. Those skilled in the art will appreciate that many different types of indices may be generated, depending on performance and other considerations. Vocabulary database 140, media content unit/keyword database 150, media content unit database 160, and index 170 are all identified as part of a general data storage area 175.

Those skilled in the art will appreciate that the actual implementation of the data storage area 175 may take a variety of forms, including storage in a computer-readable medium, and the term "database" is used in the generic sense to refer to any data structure that allows data to be stored and accessed, such as tables, linked lists, arrays, etc.

When a search is to be performed to locate a particular media content unit or category of media content units, a search service 180 receives the search query or search request and applies the search terms contained in the query against index 170. The search query may include both a text query and other information that further defines the parameters of the search. The index 170 is used to identify media content units in the database 160 that are responsive to the search query. Those skilled in the art will appreciate that standard search techniques may be used to pre-process the search query, as well as to post-process and prioritize the resulting search results that are responsive to the query. Those skilled in the art will also appreciate that some or all of the keywords may be used in a browse hierarchy to allow users to navigate to desired media content units. In some applications, the keywords may also displayed in conjunction with media content units to further characterize the media content units. The use of a structured keyword vocabulary greatly increases the speed and likelihood that users submitting search queries or browsing will be able to identify one or more media content units that are responsive to their search. Once the user identifies one or more media content units, the displayed keywords may provide an improved context in which the user may utilize the media content units.

Figure 2:
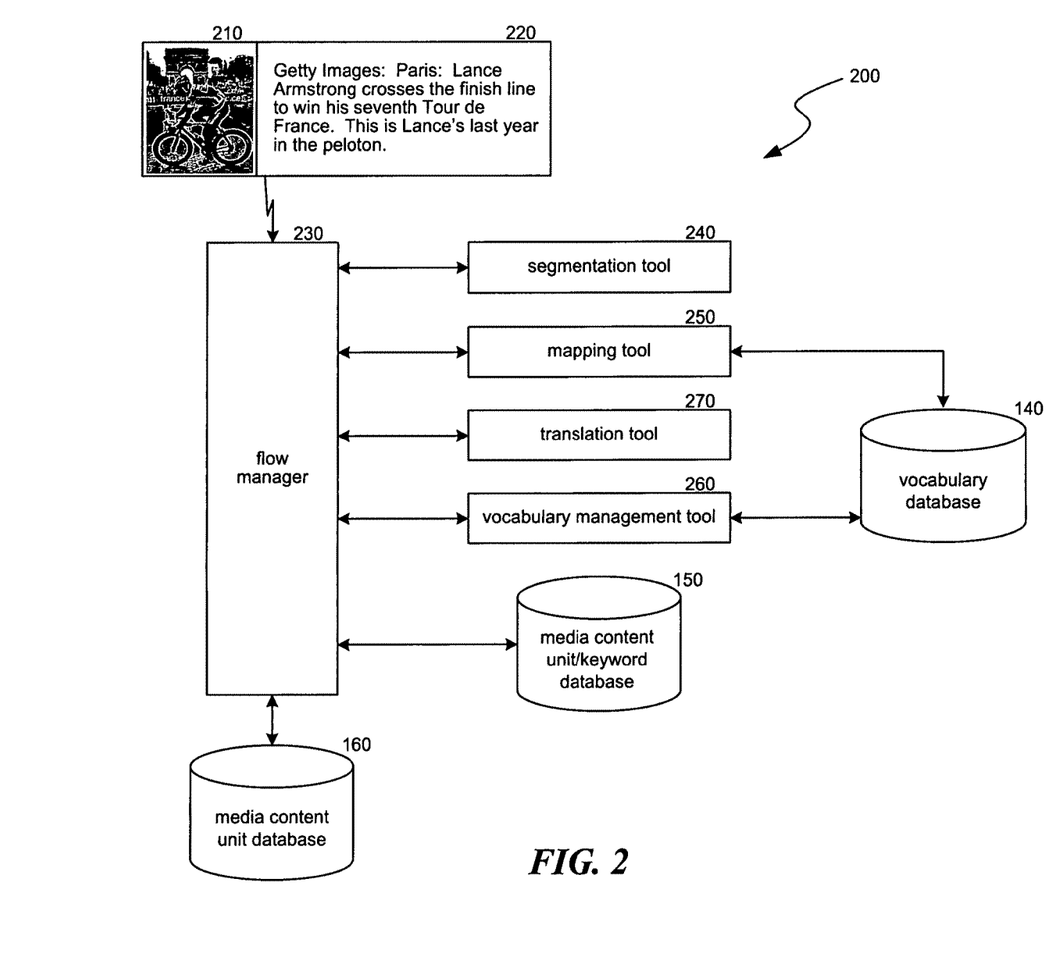
FIG. 2 is a block diagram illustrating a facility for analyzing metadata associated with media content units and storing media content units so that they are accessible via a keyword index or keyword navigation.

FIG. 2 is a block diagram illustrating the various components of the classification service 130, which receives metadata associated with media content units, analyzes the metadata, and associates keywords from the structured vocabulary with the media content units based on all or part of the metadata. In some embodiments, the classification service receives as input a media content unit 210. Associated with each media content unit is metadata 220 that provides information about the media content unit. The metadata may be provided in a variety of different formats, and may contain information such as the originating artist, the title, a general description of the contents, the date, and the size and format of the content unit. In general, each media content unit will typically have a file name and a file extension indicating the type of content (e.g., picture.bmp). In many cases, substantially more metadata may be associated with the media content unit. For example, in some embodiments a user submitting a media content unit to the facility may be required to complete a form and input certain required metadata (such as a caption and detailed description) for the submission to be accepted. The format and the amount of metadata may therefore vary significantly from media content unit to media content unit. In the example depicted in FIG. 2, the media content unit 210 is an image of Lance Armstrong at the Tour de France. Metadata 220 associated with the image provides additional details about the contents of the media content unit, specifically "Getty Images:Paris: Lance Armstrong crosses the finish to win his seventh Tour de France. This is Lance's last year in the peloton." While an image of Lance Armstrong will be used as an example in the discussion below, it will be appreciated that the image and metadata format is merely representative of the type of media content unit and metadata that may processed by the facility. In an alternate embodiment, the facility may only receive metadata that is currently, or in the future will be, associated with media content units. Such alternate embodiment will be described in additional detail below.

The media content unit 210 and associated metadata 220 is received by a flow manager 230 which manages the processing of the metadata through a variety of steps to be described in greater detail below. Flow manager 230 is connected to a segmentation tool 240, a mapping tool 250, a vocabulary management tool 260, and a translation tool 270. The segmentation tool 240 parses the metadata 220 associated with the media content unit, and separates the metadata into one or more descriptive phrases for further processing. Descriptive phrases may be comprised of one or more words, numbers, characters, or other symbols that are compared to keywords in the structured vocabulary in order to classify the media content unit. Further details about the segmentation tool are described with respect to FIG. 4.

The mapping tool 250 receives as input the descriptive phrases identified by the segmentation tool. The mapping tool 250 is connected to a database 140 that contains the structured keyword vocabulary. For each descriptive phrase associated with a media content unit, the mapping tool performs a lookup in the structured keyword vocabulary and attempts to match the descriptive phrase with a keyword contained in the vocabulary. Information about the structured keyword vocabulary, including how it is constructed and modified, may be found in U.S. Pat. No. 6,735,583 entitled "Method and System for Classifying and Locating Media Content," which is herein incorporated by this reference in its entirety. Keywords that are identified from the vocabulary database as matching the descriptive phrases are stored in association with the media content units as is described in additional detail below. Descriptive phrases that are not mapped to keywords in the vocabulary database 140 are stored as a list of candidate phrases that may be added to the structured vocabulary in the future. Further details about the mapping tool are described with respect to FIG. 5.

The vocabulary management tool 260 is a tool used to manage the composition and structure of the vocabulary database. It is primarily a tool used by operators to maintain the integrity and value of the structured vocabulary database. One function of the vocabulary management tool is to receive descriptive phrases that were not contained in the structured keyword vocabulary. Descriptive phrases are added to the vocabulary database if the descriptive phrase represents a valuable concept that is missing in the vocabulary database. Descriptive phrases are not added if the phrase is perceived to add little or no value to the structured vocabulary.

The translation tool 270 may be used to translate descriptive phrases, and particularly descriptive phrases that are candidate phrases, into other languages that are supported by the facility. The translation tool may be beneficial when a candidate phrase is not contained in the structured keyword vocabulary in the received language. By translating the candidate phrase into each of the supported languages, the candidate term may be searched or browsed in different languages without manual translation. The translation tool also be beneficial when a candidate phrase is not contained in the structured keyword vocabulary in the received language, but it is contained in the structured keyword vocabulary in a different language. By translating the candidate phrase into a language where the translated form already exists as a keyword in the structured vocabulary, the facility may leverage all pre-existing relationships that the keyword may have or information about the keyword in order to better characterize the candidate phrase.

The flow manager 230 is also connected to the media content unit database 160. When a media content unit 210 and associated metadata 220 is received by the flow manager, the media content unit 210 or a pointer to the media content unit 210 is stored in the media content unit database 160 for subsequent access. The flow manager ensures the orderly classification of media content units by the facility, making calls to the various tools and receiving results from each of the tools when processing is complete.

Figure 3:
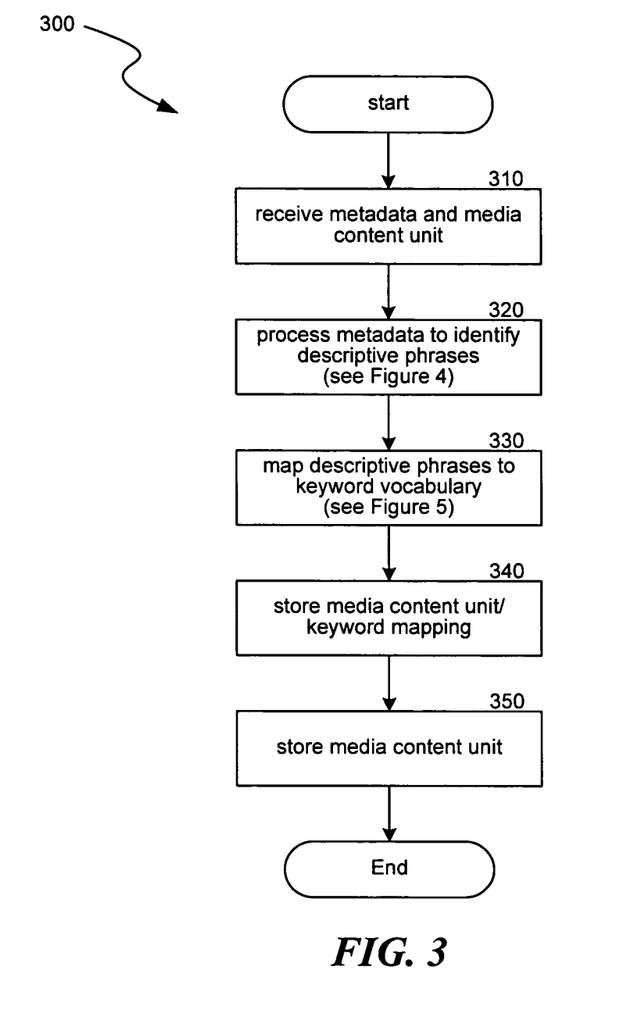
FIG. 3 is a flow diagram illustrating processing of metadata associated with a media content unit in order to associate the media content unit with keywords from a structured vocabulary.

FIG. 3 is a flow diagram presenting additional detail about the classification process 300 implemented by the facility. At a block 310, the facility receives a media content unit and associated metadata. Media content units and metadata may be received singly or in groups from a variety of internal and external sources, including third-party submissions via a Web form, third-party submissions via Email, third-party submissions via an FTP transfer, and other methods. At a block 320, the metadata is processed by the segmentation tool 240 to identify descriptive phrases contained in the metadata. The method of processing the metadata is described in greater detail in FIG. 4.

Figure 4:
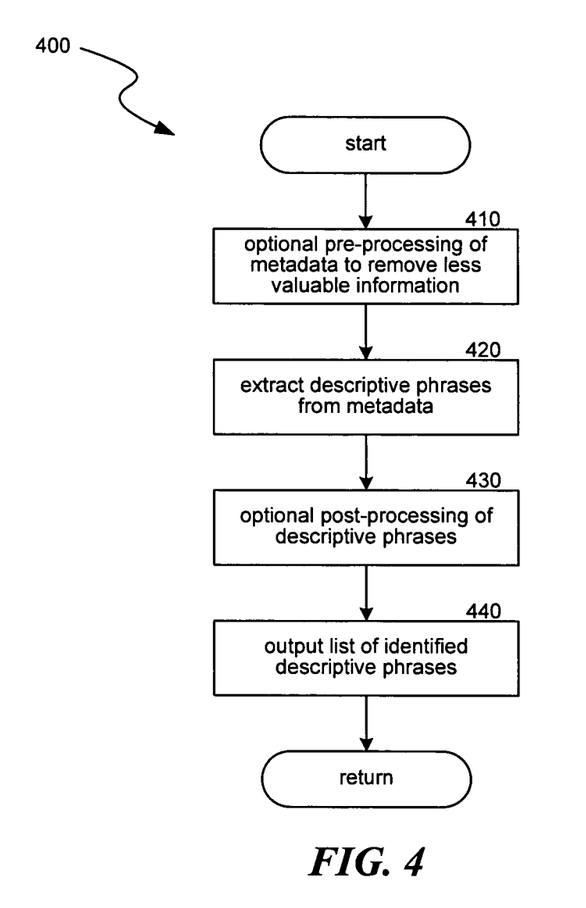
FIG. 4 is a flow diagram illustrating the operation of a segmentation tool for processing metadata associated with a media content unit.

FIG. 4 is a flow diagram of a segmentation process 400 used to automatically segment metadata into descriptive phrases. At a block 410, the facility optionally pre-processes the metadata to remove information that has been experimentally proven to be of less value in classifying a media content unit. The information that is removed will vary depending on the type of media content unit and the intended use of the classification and search system. For example, in an embodiment of the system that processes photographic images submitted by photographers, it was found that performing one or more of the following pre-processing steps to the metadata improved the classification results: (i) removing numbers; (ii) removing parentheses and the contents of any parenthetical; (iii) removing any attributions of source; (iv) removing all sentences other than the first sentence in the metadata; (v) removing some or all non-grammatical symbols; and (vi) removing all structured metadata and leaving only unstructured metadata. Note that "remove" as used in this context may mean either the physical deletion of metadata or merely the tagging of the identified metadata so that it is not further processed. The pre-processing rules may be generated manually or in an automated fashion.

At a block 420, the facility extracts descriptive phrases from the metadata that remains after the pre-processing step (if performed) or from all of the metadata (if no pre-processing). Descriptive phrases are any words, numbers, characters, or other symbols that are useful to classify the media content unit in a manner that allows the media content unit to be easily identified though search or navigation. Those skilled in the art will recognize that there are many different technologies that may be used to extract descriptive phrases from text, including statistical processing and linguistic processing (including morphological, lexical, syntactic, and semantic processing). In an embodiment of the facility, an application that is used to extract descriptive phrases is Linguistic DNA software provided by Nstein Technologies of Montreal, Canada (nstein.com). The Linguistic DNA software relies on a proprietary set of linguistic rules and a proprietary dictionary to extract content from documents. The Linguistic DNA dictionary may also be supplemented with an application-specific dictionary of terms. When applied to the example metadata 220 depicted in FIG. 2, the facility may return the descriptive phrases "Lance Armstrong," "finish line," "win," and "Tour de France." Each of these phrases is helpful in classifying the associated media content unit 210. Other components of the metadata that are less helpful to classifying the media content unit, such as "seventh," "last year," and "peloton," have been ignored by operation of the pre-processing and extraction processing step.

In an embodiment of the system, the facility provides a portion of the keywords from the keyword vocabulary database 140 as an application-specific dictionary to supplement the Linguistic DNA dictionary. The application-specific dictionary provided to the segmentation tool is less than the entire vocabulary that is contained in the vocabulary database 140. The structured vocabulary will typically contain additional vocabulary that is helpful for searching or editorial purposes, but which doesn't serve a beneficial purpose when classifying media content units. A representative example of a keyword that is helpful for searching or editorial purpose is the term "between" when used in conjunction with photographic images. When used in the context of search, "between" is useful to specify the location of one or more objects in the photographic image. When "between" is found in metadata, however, it rarely is used in a manner to connote the relative position of objects in the image. As a result, in most cases the association of the keyword "between" to an image is one that is best done manually by an editor. For that reason, although the keyword "between" will appear in the vocabulary database 140, it will not be included in the reduced vocabulary set that is used to automatically extract descriptive phrases from metadata.

At a block 430, optional post-processing is performed on the one or more descriptive phrases that were identified in block 420. Post-processing may involve formatting, spelling correction, or other manipulations of the descriptive phrase list. Post-processing may also involve assigning weights to the identified descriptive phrases. The assigned weights are values that represent the relative importance of a descriptive phrase as applied to the associated media content unit. Using the example described above, the image may be primarily directed to the concept identified by the descriptive phrase "Lance Armstrong," with the other identified descriptive phrases being applicable to the image to a lesser extent (e.g., "finish line"). In such cases, the descriptive phrase or phrases associated with the primary concept of the media content unit would receive higher weights, while the descriptive phrase or phrases associated with other concepts would receive a lower weight. Weights may be determined in a variety of ways, including but not limited to: (i) assigning a weight depending on the location of the descriptive phrase in the metadata (e.g., descriptive phrases located at the beginning of the metadata would receive a higher weight than descriptive phrases located that the end of metadata); (ii) assigning a weight based on a subjective human analysis of the media content unit; (iii) assigning a weight based on whether the descriptive phrase is contained in structured or unstructured metadata; and (iv) assigning a weight based on a linguistic analysis of the descriptive phrases. Those skilled in the art will appreciate that other methods are equally applicable for assigning weights to the descriptive phrases. At a block 440, the facility outputs the list of identified descriptive phrases. The phrases may be returned in an object list or other form to allow for subsequent manipulation.

Returning to FIG. 3, after processing the metadata to identify descriptive phrases, at a block 330 the mapping tool 250 searches the structured vocabulary database 140 to match the descriptive phrases with keywords in the vocabulary. As is described in U.S. Pat. No. 6,735,583, a structured vocabulary is used to provide a taxonomy of descriptive terms to classify and retrieve various types of media content. A benefit of using a common keyword vocabulary is that users are more easily able to identify media content units by browsing or using search queries. The method of matching the descriptive phrases to keywords is described in greater detail in FIG. 5.

Figure 5:
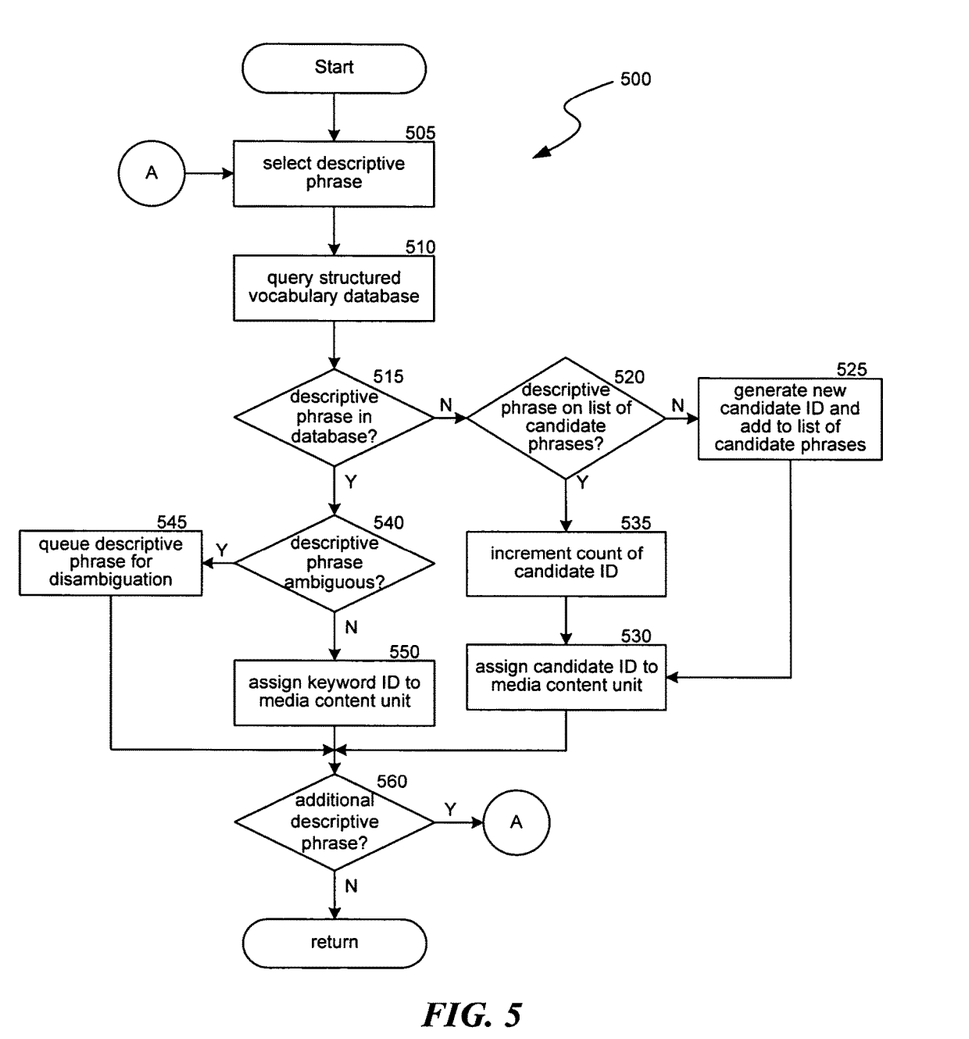
FIG. 5 is a flow diagram illustrating the operation of a mapping tool for processing descriptive phrases identified from metadata.

FIG. 5 is a flow diagram of a mapping process 500 used to automatically match descriptive phrases with keywords from the structured vocabulary. At a block 505, the facility selects a descriptive phrase from the descriptive phrases previously identified from the metadata. At a block 510, the facility queries the structured vocabulary database 140 to determine if the descriptive phrase matches a keyword contained in the structured vocabulary. Those skilled in the art will appreciate that a match may be an exact match or a close match (e.g., to account for variations in spelling, uses of wildcards, diacritics in words). Moreover, since both the descriptive phrase and the keywords in the structured vocabulary may each comprise one or more terms, all of the terms in the descriptive phrase and the keyword must match or closely match for there to be a determination that the descriptive phrase is the same as the keyword. At decision block 515, the facility determines whether the descriptive phase is contained in the structured vocabulary. If the descriptive phrase is not in the vocabulary, the facility continues to blocks 520-535. If the descriptive phrase is in the vocabulary, the facility continues to blocks 540-555.

If the descriptive phrase is not in the vocabulary, at a decision block 520 the facility checks to see if the descriptive phrase is on a list of candidate phrases that are to be considered for addition to the structured vocabulary. In order to allow the structured vocabulary to expand over time to include new concepts, the facility maintains a list of all descriptive phrases that were identified in media content unit metadata, but which aren't currently in the structured vocabulary. The list of descriptive phrases is composed of the descriptive phase, a candidate ID number (an identifier that uniquely identifies the descriptive phrase), and a count of the number of times that the descriptive phrase has been found in metadata from all media content units processed by the facility. Items in the list of descriptive phrases are referred to as "candidate phrases" since they are maintained on the list until promoted to the structured vocabulary or deleted from the list for consideration. If the facility finds the descriptive phrase on the list of candidate phrases at decision block 520, processing proceeds to block 535 where the count associated with the candidate phrase is incremented by one to indicate another occurrence of the phrase. At a block 530, the candidate ID number is associated with the media content unit from which the descriptive phrase was derived. Assigning a candidate ID number to the media content unit allows the descriptive phrase to be associated with the media content unit in the event that the descriptive phrase is promoted to be in the keyword vocabulary in the future. Assigning a candidate ID number to the media content unit also allows the media content to be located when a user searches on the particular descriptive phrase, even if that descriptive phrase hasn't yet been added to the structured vocabulary. If the facility finds that the descriptive phrase is not on the list of candidate phrases, at a block 525 the descriptive phrase is added to the list of candidate phrases and a new candidate ID number is assigned to the descriptive phrase. The facility then proceeds to block 530 where the candidate ID number is associated with the media content unit from which the descriptive phrase was derived. Following block 530, the facility proceeds to decision block 560 where a test is made to determine if any additional descriptive phrases remain to be processed by the facility. If additional descriptive phrases remain, processing continues at a block 505. Otherwise, the mapping process 500 is complete and processing returns to control of the flow manager 230.

In an embodiment of the facility, immediately or on a periodic basis the list of candidate phrases is reviewed and a decision is made on whether to remove a descriptive phrase from the list or add it as a new keyword in the structured vocabulary. The determination of whether to add the descriptive phrase is aided by the type of descriptive phrase. For example, descriptive phrases that correspond to names of famous people (e.g., celebrities, politicians, athletes), names of locations (e.g., city names, venue names, geographic feature names), and nouns (e.g., bicycle, tree) may be more likely to be added to the structured vocabulary than descriptive phrases that correspond to adjectives or descriptive phrases that correspond to similes. The determination of whether to add the descriptive phrase to the structured vocabulary is also aided by the count that is maintained of the number of occurrences of the descriptive phrase in all metadata that has been analyzed. A high count for a particular phrase may indicate that the phrase is either very topical or has been adopted by the public for general use. In such a case, the descriptive phase may be more readily added to the structured vocabulary. A low count for a particular phrase may indicate that the phrase is rarely used. In such a case, the descriptive phrase may be removed from the list of candidate phrases and added to an exclusion list. The exclusion list contains those descriptive phrases that are specifically excluded from being added to the structured vocabulary in the future. The review of the list of candidate phrases may be done on a periodic basis by an operator, with the review occurring more frequently if one or more of the candidate phrases have high counts. For example, an alarm may be associated with a count crossing a threshold, thereby triggering a review to occur. Alternatively, the review and promotion may take place automatically, such as a process whereby descriptive phrases are automatically promoted to the keyword vocabulary when the count of a particular descriptive phrase reaches a threshold number that suggests widespread adoption of the descriptive phrase.

Returning to decision block 515, if the descriptive phrase is in the structured vocabulary, the facility proceeds to a decision block 540. At decision block 540 the facility checks to see if the descriptive phrase is ambiguous. A descriptive phrase is ambiguous if there are multiple possible keyword concepts that map to the same descriptive phrase. For example, the phrase "Henry Ford" gives no indication of which Henry Ford is the appropriate one to associate with the media content unit, as there are numerous Henry Fords (e.g., the founder of the Ford Motor Company, the illustrator, the early New Orleans jazz string base player, or the British ecological geneticist, among others). Ambiguous keywords may be marked in the structured vocabulary as ambiguous, or may be identified in the structured vocabulary as being ambiguous by the fact that two or more keywords in the structured vocabulary match or closely match the descriptive phrase. If a match or close match exists between the descriptive phrase and a keyword that is considered ambiguous, at a block 545 the descriptive phrase is queued for disambiguation by an operator or by another process. The disambiguation process resolves the ambiguity of the descriptive phrase by selecting the appropriate keyword that should be associated with the media content unit. Until the descriptive phrase has been disambiguated, the descriptive phrase is not searchable by the facility using keywords from the structured vocabulary. After queuing for disambiguation, the facility continues to decision block 560 where a loop is implemented to process remaining descriptive phrases.

Returning to decision block 540, if the descriptive phrase is not ambiguous, processing continues at a block 550. At block 550, the facility assigns a keyword ID number to the media content unit. The keyword ID number is a number that uniquely identifies a keyword in the structured vocabulary. If optional post-processing had been performed on the list of descriptive phrases to weight the descriptive phrases, the weighting assigned to the descriptive phrase may also be assigned to the keyword as well. After assigning a keyword ID, the facility continues to decision block 560 where a loop is implemented to process any remaining descriptive phrases.

At decision block 560, a test is made by the facility to determine if any additional descriptive phrases remain to be processed. If phrases remain, processing continues at block 505. Otherwise, the mapping process 500 is complete and processing returns to control of the flow manager 230. At this point in the processing, each media content unit may be associated with one or more keywords in the structured vocabulary database, with one or more candidate phrases, or may have no associations based on the descriptive phrases that were identified in the media content unit's metadata.

Figure 6:
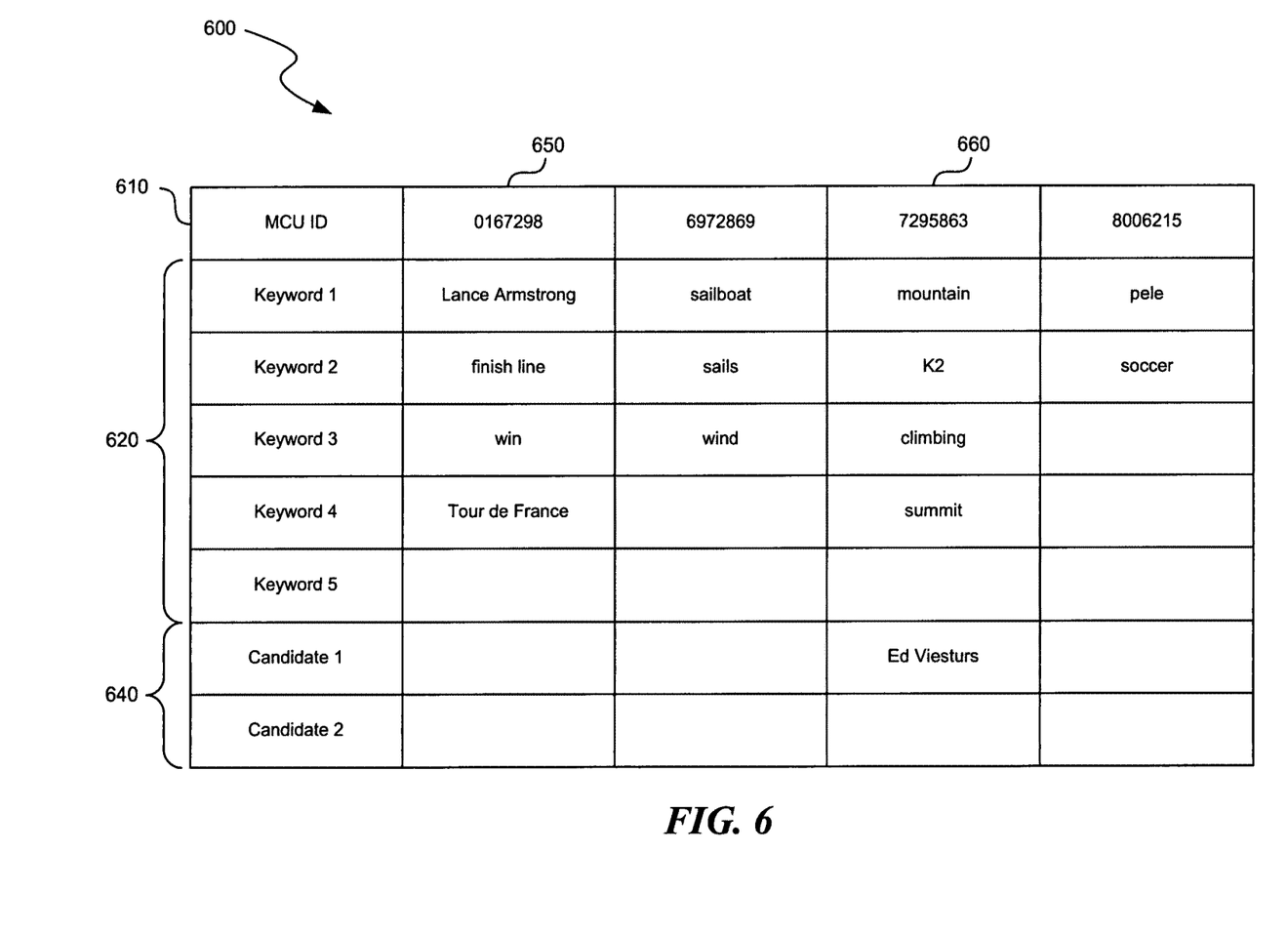
FIG. 6 is a block diagram illustrating records in a media content unit/keyword database.

Returning to FIG. 3, at a block 340 the facility stores a mapping of the media content unit with keywords from the structured vocabulary and with candidate phrases. A representative mapping table of media content units is depicted in FIG. 6. At a block 350, the facility stores the media content unit or a pointer to a location of the media content unit in the database 160 so that the media content unit can be subsequently accessed.

FIG. 6 is a block diagram of a representative table 600 that correlates each media content unit with keywords associated with that media content unit. Table 600 also correlates each media content unit with any candidate phrases. Each record in the table contains a media content unit ID field 610, one or more keyword fields 620, and one or more candidate fields 640. The media content ID field 610 contains an identification number that uniquely identifies a media content unit stored in the database 160. The one or more keyword fields 620 contain one or more keywords that have been determined to be associated with the media content unit by an analysis of the media content unit's metadata, and the one or more candidate fields 640 contain one or more candidate phrases that have been determined to be associated with the media content unit by an analysis of the metadata content unit's metadata. If the analysis of the metadata associated with a media content unit failed to identify any keywords or candidate phrases in the metadata, the keyword fields and candidate fields would be empty. Using the example media content unit shown in FIG. 2, a record 650 has been created in table 600. In record 650, the media content unit has been identified by a unique identifier "0167298," and has been associated with the keywords "Lance Armstrong," "finish line," "win," and "Tour de France." As a second example, record 660 identifies the keywords "mountain," "K2," "climbing," and "summit" for a media content unit identified by the unique identifier "7295863." Moreover, a candidate phrase "Ed Viesturs" has also been associated with the media content unit. Correlating the candidate phrase with the media content unit allows the media content unit to be identified when a search for "Viesturs" is performed, even though the descriptive phrase "Ed Viesturs" may not have been introduced into the structured vocabulary yet. It will be appreciated that while the keywords and candidate phrases are represented in table 600 in textual form for purposes of clarity, an implementation of the table would instead contain reference numbers or other pointers that uniquely identify the respective keyword or candidate phrase vocabulary database 140. It will also be appreciated that while FIG. 6 depicts a table whose contents and organization is designed to make it more comprehensible by a human reader, those skilled in the art will appreciate that the actual data structure used by the facility to store this information may differ from the table shown, and that they, for example, may be organized in a different manner (e.g., may be implemented using a number of tables rather than a single table), may contain more or less information than shown, may be compressed and/or encrypted, and may be optimized in a variety of ways.

Returning to FIG. 3, after the mapping of the media content unit to one or more keywords in the keyword vocabulary is performed at block 350, classification is complete for that particular media content unit. The classification process 300 may be repeated by the facility as required for each received media content unit.

After a media content unit has been classified by the classification service 130, the index 170 may be updated to allow the media content unit to be quickly identified. Additional information about the indexing and searching of media content units may be found in U.S. Pat. No. 6,735,583. If the optional weighting of keywords has been performed by the facility, enhanced search functionality may be provided as the weighting can be used to order or refine the search results. Those media content units having responsive keywords with greater weighting may be promoted in the search results, and those media content units having responsive keywords with lesser weighting may be demoted in the search results The keywords may also be used in a browse hierarchy to allow users to easily navigate to desired media content units, or may be displayed next to media content units to better characterize the media content units. As previously discussed, using the structured vocabulary greatly increases the likelihood of a user finding a media content unit or group of media content units in which they are interested. The automated segmentation and mapping that is managed by the flow manager 230 also ensures that a large volume of media content units can be quickly classified. As a result, search facility and navigation performance will be further improved by making the media content units capable of being located on a timely basis.

While various embodiments are described in terms of the environment described above, those skilled in the art will appreciate that various modifications may be made to the facility without impacting the overall functionality. For example, while it is contemplated that the media content unit and the metadata are stored as separate data structures, in certain formats the media content unit and the metadata may be merged into a single data structure or may be split between multiple data structures. In such an event, the facility may first separate the received media content unit and metadata into two portions that may then be manipulated in accordance with the processes described herein.

Figure 7:
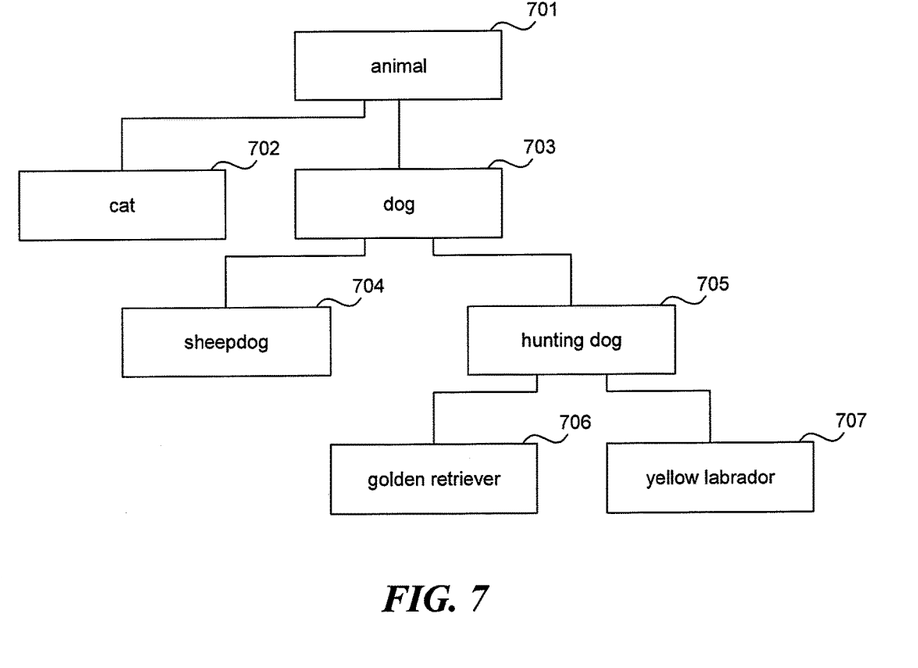
FIG. 7 is a schematic of an example portion of a structured vocabulary stored in a data repository.

FIG. 7 is a schematic of an example portion of a structured vocabulary stored in a data repository. In order to create a vocabulary-driven media classification and search system, an initial structured vocabulary must be created and stored. The vocabulary units of the vocabulary data repository are arranged logically so that vocabulary units containing terms that are logical subsets of certain vocabulary units containing broader terms are subordinated to those vocabulary units that contain the broader terms. For example, vocabulary unit 701 contains the term "animal." Because the term "cat" in vocabulary unit 702 and the term "dog" in vocabulary unit 703 are logical subsets of the broader term "animal," vocabulary unit 702 and vocabulary unit 703 both are subordinated to vocabulary unit 701, which contains the term "animal." In a similar fashion, vocabulary unit 704 and vocabulary unit 705 are subordinated to vocabulary unit 703 because "sheepdog" and "hunting dog" are both logical subsets (i.e., specific categories) of the broader term "dog," which is contained in vocabulary unit 703. Likewise, vocabulary units 706 and 707 both are subordinated to vocabulary unit 705, because "golden retriever" and "yellow labrador" are both kinds of "hunting dog." One skilled in the art will recognize that this type of classification system may be applied to most, if not all, terms used to describe media content units. The terms arranged in the hierarchy may lend themselves to an objective classification, as in the preceding example, or the terms may lend themselves to a more subjective classification, such as emotions, themes, etc., which require greater human judgment. It will also be apparent to one skilled in the art that a vocabulary unit may be subordinated to one or more other vocabulary units. For example, the term "skip" may be subordinated to both the term "run" and the term "jump." In typical embodiments, each vocabulary unit may contain terms in other languages that are largely equivalent to the corresponding terms of the default language. A single, verifying term identifier is preferably used to refer to the entire vocabulary unit to represent the relationship of that term to other terms in a language-independent fashion.

Moreover, in an alternate embodiment, when the metadata is first received by the facility it may not already be associated with media content units. For example, the received metadata may describe a type of media content unit that will be received or identified in the future. The delay in having media content units to associate with keywords does not impact processing of the metadata. The metadata is processed as described herein, with keywords identified from descriptive phrases segmented from the metadata. The keywords identified from the metadata are then stored and assigned to one or more media content units as they are identified or received in the future. In this fashion, a "bucket" of media contents units may be defined and keywords for the bucket identified in advance. As media content units are received into the bucket, they are automatically correlated with the keywords. Similarly, keywords for a single media content unit may be defined in advance and the keywords assigned to the media content unit when it is identified or received in the future.

It will also be appreciated that the facility may be implemented in a variety of environments including a single, monolithic computer system, a distributed system, as well as various other combinations of computer systems or similar devices connected in a variety of ways. The facility may utilize third-party services and data to implement all or portions of the aforementioned functionality. Moreover, as used herein, the term "database" should be interpreted to include any data structure that allows data to be stored and accessed, such as tables, linked lists, arrays, etc. Those skilled in the art will also appreciate that the steps shown in FIGS. 3, 4, and 5 may be altered in a variety of ways. For example, the order of the steps may be rearranged, substeps may be performed in parallel, steps may be omitted, or other steps may be included.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method performed by a computing device of processing metadata associated with pieces of visual content in order to classify the pieces of visual content using terms contained in a structured vocabulary, the method comprising:
    receiving over a communication network visual content having associated metadata, wherein the metadata comprises an author of the visual content, a title of the visual content, or a description of the visual content;
    automatically filtering by the computing device the received metadata to remove some elements of the metadata while retaining other elements of the metadata, wherein the elements are removed based on the type of visual content that is received, the elements that are removed comprising a subset of words, numbers, characters, or other symbols of the received metadata;
    maintaining a structured vocabulary of terms that includes terms for searching visual content, wherein each term in the structured vocabulary bears a parent, child, or sibling relationship with another term in the structured vocabulary;
    programmatically segmenting by the computing device the remaining elements of metadata into one or more descriptive phrases based on an application-specific dictionary for classifying visual content, wherein the application-specific dictionary is a subset of the maintained structured vocabulary of terms;
    comparing by the computing device the one or more descriptive phrases with the structured vocabulary of terms in order to identify one or more terms in the structured vocabulary that are related to the one or more descriptive phrases; and
    creating by the computing device an association between the identified one or more terms and the visual content so that the visual content is characterized by the one or more terms.

2. The computer-implemented method of claim 1, wherein automatically filtering the metadata further includes removing source attributions from the metadata.

3. The computer-implemented method of claim 1, wherein the other symbols are non-grammatical.

4. The computer-implemented method of claim 1, wherein automatically filtering the metadata further includes removing structured metadata from the metadata.

5. The computer-implemented method of claim 1, wherein the metadata is segmented using statistical processing.

6. The computer-implemented method of claim 1, wherein the metadata is segmented using linguistic processing.

7. The computer-implemented method of claim 1, wherein the visual content is moving imagery.

8. The computer-implemented method of claim 1, wherein the visual content is an image.

9. The computer-implemented method of claim 1, wherein comparing the one or more descriptive phrases with a structured vocabulary of terms includes identifying one or more descriptive phrases that are not in the structured vocabulary.

10. The computer-implemented method of claim 9, wherein the one or more descriptive phrases that are not in the structured vocabulary are maintained in a list of potential phrases to add to the structured vocabulary.

11. The computer-implemented method of claim 1, further comprising assigning a weight to each descriptive phrase according to a relative importance of each descriptive phrase to the media content unit.

12. The computer-implemented method of claim 11, wherein an assigned weight depends on a location of the descriptive phrase in the received metadata.

13. The computer-implemented method of claim 11, wherein an assigned weight depends on whether the descriptive phase is contained in structured or unstructured metadata.

14. The computer-implemented method of claim 11, wherein an assigned weight depends on a linguistic analysis of the descriptive phase.

15. A system for processing metadata associated with pieces of visual content in order to classify the pieces of visual content using terms contained in a structured vocabulary, the system comprising:
    a processor and a memory;
    a structured vocabulary component for maintaining terms for searching visual content, wherein each term in the structured vocabulary bears a parent, child, or sibling relationship with another term in the structured vocabulary;
    a segmentation component for:
        receiving over a communication network pieces of visual content having associated metadata, wherein the metadata comprises an author of the visual content, a title of the visual content, or a description of the visual content;
        automatically filtering the received metadata to remove some elements of the metadata while retaining other elements of the metadata based on the type of visual content that is received, the elements that are removed comprising a subset of words, numbers, characters, or other symbols of the received metadata; and
        segmenting the other elements of metadata into one or more descriptive phrases characterizing the pieces of visual content based on an application-specific dictionary for classifying visual content, wherein the application-specific dictionary is a subset of the structured vocabulary of terms;
    a matching component for comparing the one or more descriptive phrases generated by the segmentation component with the structured vocabulary of terms in order to identify one or more terms in the structured vocabulary that are correlated with the one or more descriptive phrases for the pieces of visual content; and
    a mapping component that, for the pieces of visual content, provides a relationship between each piece of visual content and the one or more terms in the structured vocabulary that were identified by the matching component.

16. The system of claim 15, wherein automatically filtering the metadata further includes removing source attributions from the metadata.

17. The system of claim 15, wherein the other symbols are non-grammatical.

18. The system of claim 15, wherein automatically filtering the metadata further includes removing structured metadata from the metadata.

19. The system of claim 15, wherein the segmentation component segments the metadata using statistical processing.

20. The system of claim 15, wherein the segmentation component segments the metadata using linguistic processing.

21. The system of claim 15, wherein the visual content is moving imagery.

22. The system of claim 15, wherein the visual content is an image.

23. The system of claim 15, wherein the matching component further identifies one or more descriptive phrases that are not in the structured vocabulary of terms.

24. The system of claim 23, wherein the matching component further adds the identified one or more descriptive phrases that are not in the structured vocabulary to a list of potential phrases to add to the structured vocabulary.

25. The system of claim 15, wherein the segmentation component further assigns a weight to each descriptive phrase according to a relative importance of each descriptive phrase to the media content unit.

26. The system of claim 25, wherein an assigned weight depends on a location of the descriptive phrase in the received metadata.

27. The system of claim 25, wherein an assigned weight depends on whether the descriptive phase is contained in structured or unstructured metadata.

28. The system of claim 25, wherein an assigned weight depends on a linguistic analysis of the descriptive phase.

29. A method performed by a computing device of processing descriptive text associated with visual content in order to classify the visual content using terms contained in a structured vocabulary, the method comprising:
receiving, over a communication network, visual content having associated descriptive text, wherein the descriptive text comprises an author of the visual content, a title of the visual content, or a description of the visual content;
automatically filtering by the computing device the received descriptive text to remove a first portion of the descriptive text while retaining a second portion of the descriptive text based on the type of visual content that is received, the first portion of the descriptive text comprising a subset of words, numbers, characters, or other symbols of the received descriptive text;
maintaining a structured vocabulary of terms that includes terms for searching visual content, wherein each term in the structured vocabulary bears a parent, child, or sibling relationship with another term in the structured vocabulary;
programmatically segmenting by the computing device the second portion of descriptive text into one or more descriptive phrases based on an application-specific dictionary for classifying visual content, wherein the application-specific dictionary is a subset of the structured vocabulary of terms;
comparing by the computing device the identified one or more descriptive phrases with the structured vocabulary of terms in order to identify one or more terms in the structured vocabulary that are related to the one or more descriptive phrases; and
creating by the computing device an association between the identified one or more terms and the image so that the visual content is classified by the one or more terms.

30. The computer-implemented method of claim 29, wherein automatically filtering the descriptive text further includes removing source attributions from the descriptive text.

31. The computer-implemented method of claim 29, wherein the other symbols are non-grammatical.

32. The computer-implemented method of claim 29, wherein automatically filtering the metadata further includes removing structured metadata from the metadata.

33. The computer-implemented method of claim 29, wherein the descriptive text is segmented using statistical processing.

34. The computer-implemented method of claim 29, wherein the descriptive text is segmented using linguistic processing.

35. The computer-implemented method of claim 29, wherein comparing the one or more descriptive phrases with a structured vocabulary of terms includes identifying one or more descriptive phrases that are not in the structured vocabulary.

36. The computer-implemented method of claim 35, wherein the one or more descriptive phrases that are not in the structured vocabulary are maintained in a list of potential phrases to add to the structured vocabulary.

37. The computer-implemented method of claim 29, wherein the visual content is moving imagery.

38. The computer-implemented method of claim 29, wherein the visual content is an image.

39. The computer-implemented method of claim 29, further comprising assigning a weight to each descriptive phrase according to a relative importance of each descriptive phrase to the media content unit.

40. The computer-implemented method of claim 39, wherein an assigned weight depends on a location of the descriptive phrase in the received metadata.

41. The computer-implemented method of claim 39, wherein an assigned weight depends on whether the descriptive phase is contained in structured or unstructured metadata.

42. The computer-implemented method of claim 39, wherein an assigned weight depends on a linguistic analysis of the descriptive phase.

43. A non-transitory computer-readable storage medium containing instructions for controlling a computer processor in a computer system to classify media content units using terms contained in a structured vocabulary by:
receiving over a communication network a media content unit with associated metadata, wherein the media content unit is visual content and the metadata comprises an author of the media content unit, a title of the media content unit, or a description of the media content unit;
automatically filtering the received metadata to remove a first portion of the metadata while retaining a second portion of the metadata based on the type of media content unit that is received, the first portion comprising a subset of words, numbers, characters, or other symbols of the received metadata;
maintaining a structured vocabulary of terms that include terms for search media content units, wherein each term in the structured vocabulary bears a parent, child, or sibling relationship with another term in the structured vocabulary;

programmatically segmenting the second portion of the metadata into one or more descriptive phrases based on an application-specific dictionary for classifying media content units, wherein the application-specific dictionary is a subset of the structured vocabulary of terms;

comparing the one or more descriptive phrases with the structured vocabulary of terms in order to identify one or more terms in the structured vocabulary that are related to the one or more descriptive phrases; and creating an association between the identified one or more terms and the media content unit so that the media content unit is classified by the one or more terms.

44. A system for segmenting metadata associated with a plurality of media content units and classifying the media content units using terms contained in a structured keyword vocabulary, the system comprising:

a processor and a memory;

a structured keyword vocabulary used to classify media content units, wherein the media content units are visual content, and wherein each term in the structured keyword vocabulary bears a parent, child, or sibling relationship with another term in the structured keyword vocabulary;

a segmentation component for:
  receiving metadata for association with a plurality of media content units, wherein the metadata comprises authors of the media content units, titles of the media content units, or descriptions of the media content units;
  filtering the received metadata to remove some elements of the metadata while retaining other elements of the metadata based on the type of media content unit that is received, the elements that are removed comprising a subset of words, numbers, characters, or other symbols of the received metadata; and
  segmenting the metadata to generate one or more descriptive phrases characterizing the plurality of media content units, wherein the segmentation component utilizes an application-specific dictionary for classifying media content units that is a subset of the structured keyword vocabulary that includes terms for searching media content units to segment the received metadata;

a matching component for comparing the one or more descriptive phrases generated by the segmentation component with the structured keyword vocabulary of terms in order to identify one or more terms in the structured keyword vocabulary that are correlated with the one or more descriptive phrases for each media content unit; and a mapping component that, for the media content units, provides a relationship between each media content unit and the one or more terms in the structured keyword vocabulary that were identified by the matching component.

45. The system of claim 44, wherein the application-specific dictionary excludes keywords in the structured keyword vocabulary that primarily relate to editorial functions.

46. A method performed by a computing device of segmenting metadata associated with a plurality of media content units and classifying the media content using terms contained in a structure keyword vocabulary, the method comprising:

(a) receiving metadata for association with a plurality of media content units, the plurality of media content units comprising visual content, the metadata comprising authors of the media content units, titles of the media content units, or descriptions of the media content units;

(b) filtering the received metadata to remove some elements of the metadata and retain other elements of the metadata, wherein the elements that are removed comprise a subset of words, numbers, characters, or other symbols of the received metadata, and wherein the elements are removed based on the type of media content unit that is received;

(c) maintaining a structured keyword vocabulary that is used to search the plurality of media content units, wherein each term in the structured vocabulary bears a parent, child, or sibling relationship with another term in the structured vocabulary;

(d) programmatically segmenting by the computing device the received metadata to generate one or more descriptive phrases associated with the plurality of media content units utilizing an application-specific dictionary for classifying media content units, wherein the application-specific dictionary is a subset of the structured keyword vocabulary;

(e) comparing the one or more descriptive phrases with the structured keyword vocabulary of terms in order to identify one or more terms in the structured keyword vocabulary that are associated with one or more descriptive phrases for each media content unit; and (f) creating a relationship between the identified one or more terms and each media content unit so that each media content unit is characterized by the identified one or more terms.

47. The computer-implemented method of claim 46, wherein the application-specific dictionary excludes keywords in the structured vocabulary that primarily relate to editorial functions.

* * * * *

UNITED STATES PATENT AND TRADEMARK OFFICE
CERTIFICATE OF CORRECTION

PATENT NO. : 10,445,359 B2
APPLICATION NO. : 11/449380
DATED : October 15, 2019
INVENTOR(S) : Bjarnestam et al.

It is certified that error appears in the above-identified patent and that said Letters Patent is hereby corrected as shown below:

In the Claims

In Column 18, Line 12, in Claim 46, after "content" insert -- units --.

In Column 18, Line 13, in Claim 46, delete "structure" and insert -- structured --, therefor.

In Column 18, Line 43, in Claim 46, after "with" insert -- the --.

Signed and Sealed this
Ninth Day of June, 2020

Andrei Iancu
*Director of the United States Patent and Trademark Office*